United States Patent
Tang et al.

(10) Patent No.: US 11,328,402 B2
(45) Date of Patent: May 10, 2022

(54) METHOD AND SYSTEM OF IMAGE BASED ANOMALY LOCALIZATION FOR VEHICLES THROUGH GENERATIVE CONTEXTUALIZED ADVERSARIAL NETWORK

(71) Applicant: Hong Kong Applied Science and Technology Research Institute Company Limited, Hong Kong (HK)

(72) Inventors: Wai Kai Arvin Tang, Hong Kong (HK); Pak Kan Wong, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 17/035,729

(22) Filed: Sep. 29, 2020

(65) Prior Publication Data
US 2022/0101508 A1    Mar. 31, 2022

(51) Int. Cl.
| | |
|---|---|
| *G06K 9/00* | (2022.01) |
| *G06T 7/00* | (2017.01) |
| *G06T 7/40* | (2017.01) |
| *G06T 7/11* | (2017.01) |

(52) U.S. Cl.
CPC ............ *G06T 7/0002* (2013.01); *G06T 7/11* (2017.01); *G06T 7/40* (2013.01); *G06T 2207/20084* (2013.01); *G06T 2207/30252* (2013.01)

(58) Field of Classification Search
CPC . G06T 7/0002; G06T 7/11; G06T 7/40; G06T 2207/20084; G06T 2207/30252

USPC ......................................................... 382/108
See application file for complete search history.

(56) References Cited

U.S. PATENT DOCUMENTS

| | | | |
|---|---|---|---|
| 10,839,506 B1 * | 11/2020 | Raghu | .................. G06N 3/0454 |
| 2018/0260793 A1 | 9/2018 | Li et al. | |
| 2018/0293552 A1 | 10/2018 | Zhang et al. | |
| 2018/0374204 A1 | 12/2018 | Manhart | |

(Continued)

FOREIGN PATENT DOCUMENTS

| | | |
|---|---|---|
| CN | 109657716 A | 4/2019 |
| CN | 111223093 A | 6/2020 |

(Continued)

OTHER PUBLICATIONS

Jayawardena, Srimal. "Image based automatic vehicle damage detection." (2013). (Year: 2013).*

(Continued)

*Primary Examiner* — Jonathan S Lee
(74) *Attorney, Agent, or Firm* — Idea Intellectual Limited; Margaret A. Burke; Sam T. Yip

(57) ABSTRACT

The present invention provides an anomaly detection method and apparatus based on a neural network which can be trained on undamaged normal vehicle images and able to detect unknown/unseen vehicle damages of stochastic types and extents from images which are taken in various contexts. The provided method and apparatus are implemented with functional units which are trained to perform the anomaly detection under a GCAN model with a training dataset containing images of undamaged vehicles, intact-vehicle frame images and augmented vehicle frame images of the vehicles.

9 Claims, 4 Drawing Sheets

(56) References Cited

U.S. PATENT DOCUMENTS

2019/0244337 A1    8/2019    Niculescu-Mizil et al.

FOREIGN PATENT DOCUMENTS

| CN | 111340791 A | 6/2020 | |
|---|---|---|---|
| WO | WO-2020048271 A1 * | 3/2020 | ........... G06N 3/0454 |

OTHER PUBLICATIONS

Mao, Jianxiao, Hao Wang, and Billie F. Spencer Jr. "Toward data anomaly detection for automated structural health monitoring: Exploiting generative adversarial nets and autoencoders." Structural Health Monitoring 20.4 (2021): 1609-1626. (Year: 2021).*

Papadopoulos, Stavros, Anastasios Drosou, and Dimitrios Tzovaras. "Modelling of material ageing with generative adversarial networks." 2018 IEEE 13th Image, Video, and Multidimensional Signal Processing Workshop (IVMSP). IEEE, 2018. (Year: 2018).*

Rastin, Zahra, Gholamreza Ghodrati Amiri, and Ehsan Darvishan. "Generative Adversarial Network for Damage Identification in Civil Structures." Shock and Vibration 2021 (2021). (Year: 2021).*

Tilon, Sofia, et al. "Post-disaster building damage detection from earth observation imagery using unsupervised and transferable anomaly detecting generative adversarial networks." Remote Sensing 12.24 (2020): 4193. (Year: 2020).*

Qinghui Zhang et al., "Vehicle-Damage-Detection Segmentation Algorithm Based on Improved Mask RCNN", IEEE Access, 2000, vol. 8, p. 6997-7004.

Yashaswini HV et al., "Car Damage Detection and Analysis Using Deep Learning Algorithm for Automotive", International Journal of Scientific Research & Engineering Trends, 2019, vol. 5, Issue 6, p. 1896-1898.

Davide Cozzolino et al., "Single-image splicing localization through autoencoder-based anomaly detection", 2016 IEEE International Workshop on Information Forensics and Security (WIFS), 2016, p. 1-6.

Zhaoyue Wu et al., "Low-Rank and Collaborative Representation for Hyperspectral Anomaly Detection", IGARSS 2019-2019 IEEE International Geoscience and Remote Sensing Symposium, 2019, p. 1394-1397.

Samet Akcay et al., "GANomaly: Semi-Supervised Anomaly Detection via Adversarial Training", Asian Conference on Computer Vision, Springer, Cham, 2018, p. 622-637.

Joanna Kazzandra DUMAGPI et al., "A New GAN-Based Anomaly Detection (GBAD) Approach for Multi-Threat Object Classification on Large-Scale X-Ray Security Images", IEICE Transactions on Information and Systems, 2020, vol. 103, p. 454-458.

International Search Report and Written Opinion of corresponding PCT Patent Application No. PCT/CN2020/120215 dated Jun. 24, 2021.

* cited by examiner

METHOD AND SYSTEM OF IMAGE BASED ANOMALY LOCALIZATION FOR VEHICLES THROUGH GENERATIVE CONTEXTUALIZED ADVERSARIAL NETWORK

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to image processing technology. More specifically, the present invention relates to techniques of localization of abnormal regions of a vehicle's image with the use of a generative contextualized adversarial network (GCAN).

BACKGROUND OF THE INVENTION

When there is an insurance claim for a motor vehicle due to a traffic accident, in addition to information provided by the claimant for insurance claim processing, it is usually required to have an inspector or claim adjustor to take photos and conduct on-site assessment of the extent of damage of the vehicle before the insurance company can offer an accurate compensation to the insured person.

A number of approaches have been adopted by the industry for remote assessment of damages to vehicles. For examples, U.S. Patent Application Publication No. 2018/0260793A1 disclosed a method for automatically estimating a repair cost for a vehicle based on the use of a classical convolutional neural network (CNN) that requires a plurality of historical images in its training. U.S. Patent Application Publication No. 2018/0293552A1 disclosed a number of methods for generating a vehicle repair plan based on the damaged area and the damage type; and U.S. Patent Application Publication No. 2019/0244337A1 disclosed an unsupervised image-based anomaly detection system using multi-scale context-dependent deep autoencoding gaussian mixture model.

Nonetheless, a problem with the aforesaid neural network-based approaches is that they require a large number of annotated images of damaged vehicles or vehicle components as training datasets for machine learning. As images of vehicle damages are relatively scarce and damages are too varied (e.g., there are no "typical" damages), the training datasets based on images of damaged vehicles are always insufficient to achieve a detection capability to detect unknown/unseen vehicle damages of stochastic types and extents, such as shape deformation of vehicle frame, from images which are taken in various contexts. Thus, there is a need in the field for a better approach.

SUMMARY OF THE INVENTION

One objective of the present invention is to provide an anomaly detection method and apparatus based on a neural network that can be trained with only images of normal undamaged vehicles but able to detect vehicle damages of stochastic types and extents from images that are taken in various contexts. The provided method and apparatus are implemented with functional units which are trained to perform the anomaly detection under a GCAN model with a training dataset containing images of normal undamaged vehicles.

In accordance to various embodiments, the functional units comprise at least an image processor configured for segmenting one or more input vehicle images; a texture encoder configured for generating texture feature maps from the segmented vehicle images; a frame extractor configured for extracting vehicle frame images from the segmented vehicle images; an intact-vehicle frame (IVF) reconstructor configured for reconstructing IVF images from vehicle frame images extracted by the frame extractor; an image reconstructor configured for reconstructing intact-vehicle images from reconstructed IVF images generated by the IVF reconstructor and texture feature maps generated by the texture encoder; an anomaly locator configured for comparing processed vehicle images and their corresponding reconstructed intact-vehicle images to detect anomaly regions; a frame encoder discriminator configured for generating a score of likelihood between two IVF feature maps; and an image discriminator configured for generating a score of likelihood between the input vehicle image and the reconstructed vehicle image.

In accordance to various embodiments, the functional units are generative convolutional neural networks (generators) which are trained under a generative contextualized adversarial network (GCAN) model with a training dataset containing a plurality of images of undamaged vehicles, IVF images and augmented vehicle frame images of the vehicles.

In one embodiment, the training of generators comprises extracting an IVF image from an input vehicle image by a frame extractor, wherein the input vehicle image is a real or augmented image of a normal vehicle; extracting a texture feature map from the input vehicle image by a texture encoder; generating a damage-augmented vehicle frame image by performing a damage augmentation to the IVF image by an image processor; generating a first IVF feature map from the damage-augmented vehicle frame image by a first frame encoder; reconstructing an IVF image from the first IVF feature map by a frame decoder; reconstructing an intact-vehicle image from the reconstructed IVF image and the texture feature map by an image reconstructor; extracting a second reconstructed IVF image from the reconstructed intact-vehicle image by the frame extractor; generating a second IVF feature map from the second reconstructed IVF image by a second frame encoder; generating a score of likelihood between the first IVF feature map and the second IVF feature map by a frame encoder discriminator; using the score of likelihood between the first IVF feature map and the second IVF feature map to optimize the parameterization of the frame encoder of the IVF reconstructor and the frame extractor.

BRIEF DESCRIPTION OF THE DRAWINGS

Embodiments of the invention are described in more detail hereinafter with reference to the drawings, in which.

DETAILED DESCRIPTION

In the following description, methods and apparatuses using a generative contextualized adversarial network (GCAN) model for anomaly detection for vehicle damage assessment and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
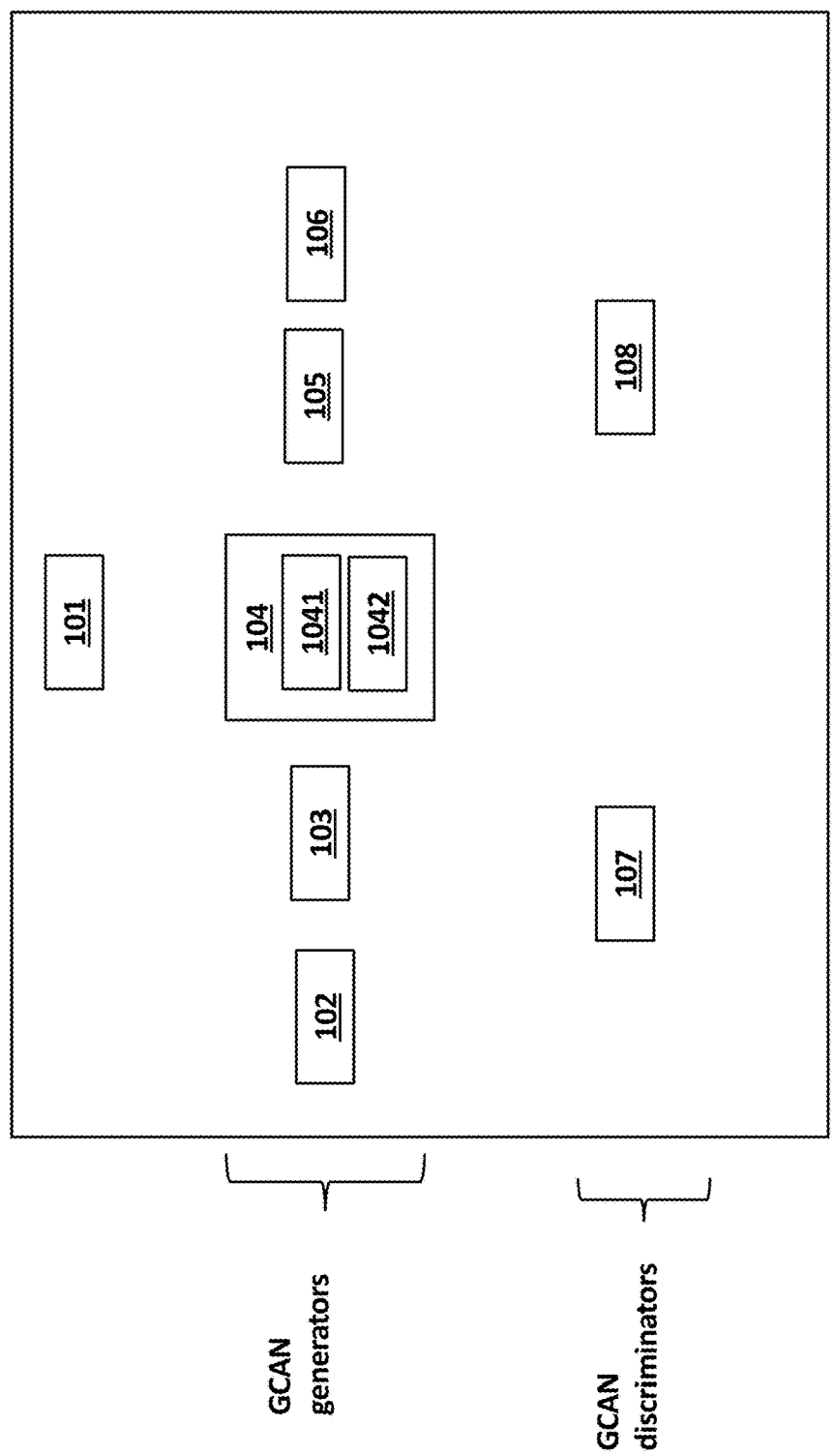
FIG. 1 depicts a block diagram illustrating functional units of the apparatus for image-based anomaly detection for vehicle damage assessment in accordance with one embodiment of the present invention.

FIG. 1 depicts a block diagram illustrating functional units of an apparatus for image-based anomaly detection for vehicle damage assessment in accordance with one embodiment of the present invention. The apparatus may comprise an image processor 101 configured for performing various imaging processing techniques such as image segmentation and augmentation on input images of vehicles; a texture encoder 102 configured for generating texture feature maps from vehicle images processed by the image processor 101; a frame extractor 103 configured for extracting vehicle frame images from vehicle images processed by the image processor 101; an IVF reconstructor 104 configured for reconstructing IVF images from vehicle frame images extracted by the frame extractor 103; an image reconstructor 105 configured for reconstructing intact-vehicle images from the reconstructed IVF images generated by the IVF reconstructor 104 and texture feature maps generated by the texture encoder 102; and an anomaly locator 106 configured for comparing processed vehicle images and their corresponding reconstructed intact-vehicle images to detect anomaly regions. The IVF reconstructor 104 may include a frame encoder 1041 configured for mapping extracted vehicle frame images to generate IVF feature maps and a frame decoder 1402 configured for remapping IVF feature maps back to IVF images.

Preferably, the frame encoder 1041 may comprise a stack of convolutional layers configured to extract multi-scale context information represented in an IVF feature map. The frame decoder 1042 may comprise a stack of deconvolutional layers to reconstruct an intact vehicle frame from the IVF feature map. Skip connections may be used to connect the convolutional layers of the frame encoder 1041 to the deconvolution layers of the frame decoder 1042 such that fine details and reconstruction locations of edges in the vehicle frame at pixel level can be better preserved.

In one embodiment, the texture encoder 102, frame extractor 103, IVF reconstructor 104, image reconstructor 105, and anomaly locator 106 are generative convolutional neural networks (generators) which are trained under a generative contextualized adversarial network (GCAN) model with a training dataset containing a plurality of images of undamaged vehicles, IVF images and augmented vehicle frame images of the vehicles. The trained generators are then used to perform the anomaly detection.

In the training of the generators, the apparatus further includes: a frame encoder discriminator 107 configured for generating a score of likelihood between two IVF feature maps and an image discriminator 108 configured for generating a score of likelihood between an input vehicle image and a corresponding reconstructed vehicle image. In one embodiment, the frame encoder discriminator 107 and image discriminator 108 may be discriminative convolutional neural networks. The frame encoder discriminator 107 and image discriminator 108 can also be trained via the GCAN model.

Figure 2:
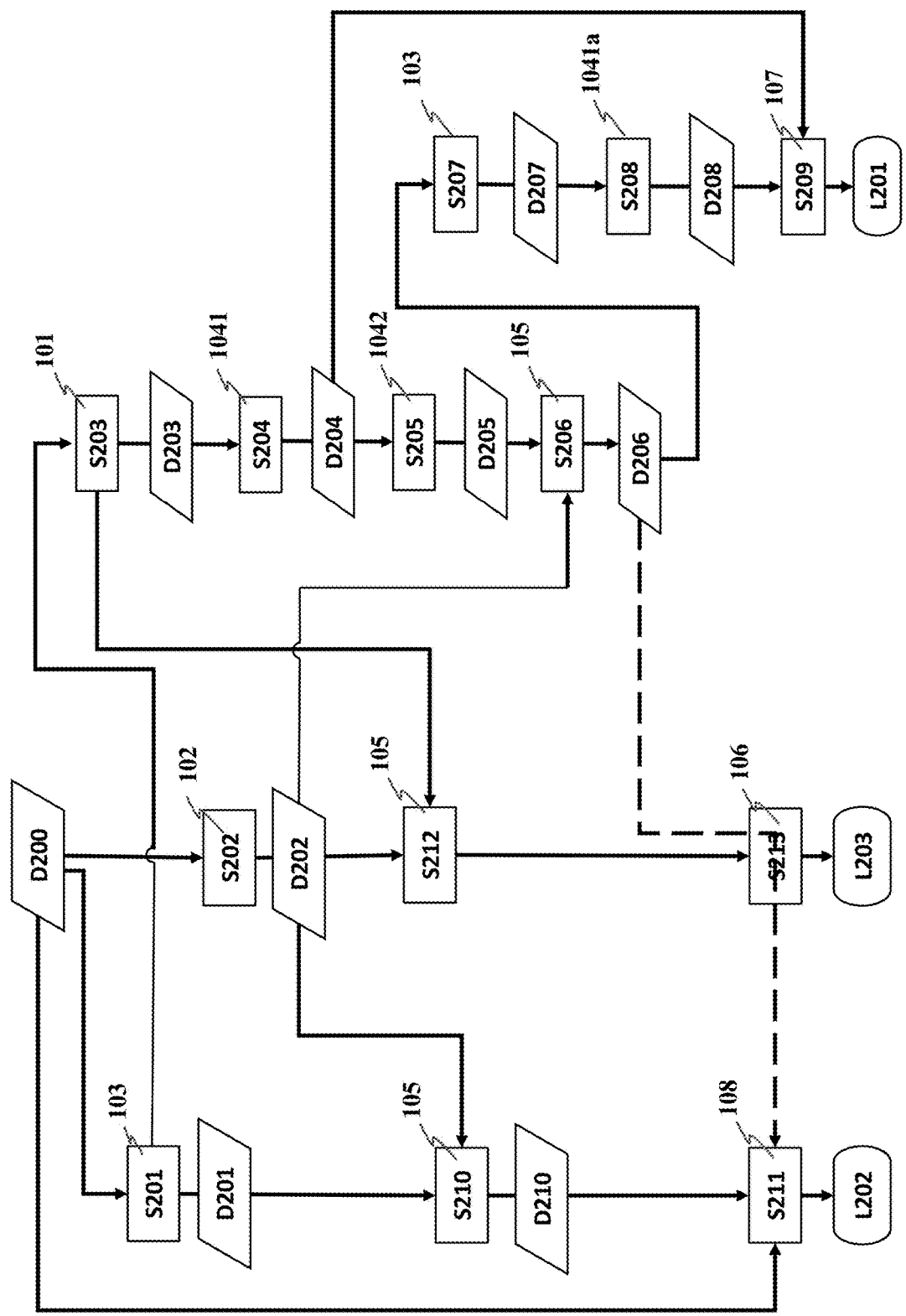
FIG. 2 depicts a process of training the GCAN-based generators for image-based anomaly detection for vehicle damage assessment in accordance with one embodiment of the present invention.

FIG. 2 depicts a process of training the GCAN-based generators for image-based anomaly detection for vehicle damage assessment in accordance with one embodiment of the present invention. To increase the representational power of the training dataset, image augmentation techniques are used to create more vehicle image samples. For example, a vehicle image may be flipped (mirrored) to create a new image, of which features are computed and added to the training dataset. The training process comprises:

S201: extracting an IVF image D201 from an input vehicle image D200 by the frame extractor 103, wherein the input vehicle image D200 may be a real or augmented image of a normal vehicle (without damages);

S202: extracting a texture feature map D202 from the input vehicle image D200 by the texture encoder 102; wherein the texture feature map D202 contains spatial texture feature information of the input vehicle image D200;

S203: perform a damage augmentation to the IVF image D201 to generate a damage-augmented vehicle frame image D203 by the image processor 101; wherein in one embodiment, the damage augmentation comprises modifying one or more randomly selected regions in the vehicle frame image D201, and wherein the modification includes one or more of random translation, random rotation, random scaling, random line addition, noise addition, partial occlusion, and region substitution by replacing the selected region with a dissimilar region of another vehicle frame image;

S204: generating a first IVF feature map D204 from the damage-augmented vehicle frame image D203 by the (first) frame encoder 1041;

S205: reconstructing an IVF image D205 from the first IVF feature map D204 by the frame decoder 1042;

S206: reconstructing an intact-vehicle image D206 from the reconstructed IVF image D205 and the texture feature map D202 by the image reconstructor 105;

S207: extracting a second reconstructed IVF image D207 from the reconstructed intact-vehicle image D206 by the frame extractor 103;

S208: generating a second IVF feature map D208 from the second reconstructed IVF image D207 by the (second) frame encoder 1041a;

S209: generating a score of likelihood L201 between the first IVF feature map D204 and the second IVF feature map D208 by the frame encoder discriminator 107; and using the scores of likelihood L203 to optimize the parameterization of the frame encoder 1041 of the IVF reconstructor 104 and the frame extractor 103;

S210: reconstructing a vehicle image D210 from the IVF image D201 and the texture feature map D202 by the image reconstructor 105;

S211: generating a score of likelihood L202 between the input vehicle image D200 and the reconstructed vehicle image D210 by the image discriminator 108; and using the scores of likelihood L202 to optimize the parameterization of the image reconstructor 105 and the texture encoder 102;

Alternatively, Step S211 may be: generating a score of likelihood L202 between the input vehicle image D200 and the reconstructed intact-vehicle image D206 by the image discriminator 108; and using the scores of likelihood L202 to optimize the parameterization of the image reconstructor 105 and the texture encoder 102;

S212: reconstructing a damaged-vehicle image D212 from the damage-augmented vehicle frame image D203 and the texture feature map D202 by the image reconstructor 105; and S213: detecting anomaly regions by comparing the reconstructed damaged-vehicle image D212 and the reconstructed intact-vehicle image D206 to generate an anomaly region detection score L203 by the anomaly locator 106; and using the anomaly region detection score L203 to optimize the parameterization of the anomaly locator 106.

In one embodiment, the (first) frame encoder 1041 and the (second) frame encoder 1041a are the same frame encoder 1041.

For optimizing the parameterization of the generators, derivatives (or gradient values) of the scores of likelihoods with respect to weight values of the generators are calculated and used to update the weight values. For a score of likelihood related to more than one generators, a chain rule of differential calculus is applied for the calculation in which the gradient values of the score of likelihood with respect to the weight values of the generator at the last network layer is calculated and then used to calculate the gradient values with respect to the weight values of the generator at the second last network layer. The calculation is then repeated until gradient values for each and every weight values of the related generators are obtained. Then these gradient values are subtracted from the corresponding weight values to obtain the updated weight values in order to improve the performance of the generators.

For examples, the gradient values of score of likelihood L201 with respect to the weight values of the frame encoder 1041 of the IVF reconstructor 104 is calculated and then used to calculate the gradient values with respect to weight values of the frame extractor 103. The gradient values of score of likelihood L202 with respect to the weight values of the image reconstructor 105 is calculated and then used to calculate the gradient values with respect to the weight values of the texture encoder 102.

Figure 3:
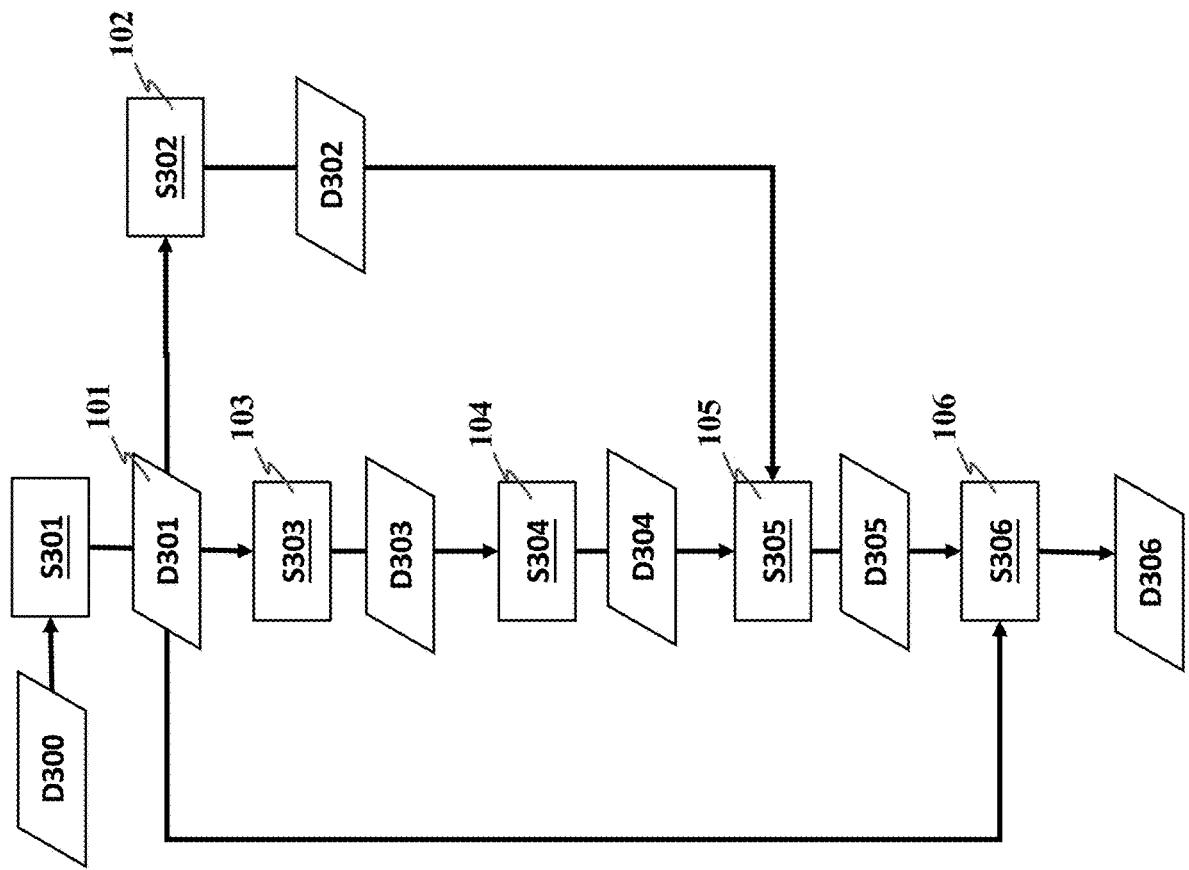
FIG. 3 depicts a process of inference by the apparatus for image-based anomaly detection for vehicle damage assessment in accordance with one embodiment of the present invention.

FIG. 3 depicts a process of inference by the apparatus for image-based anomaly detection vehicle for damage assessment in accordance with one embodiment of the present invention. The inference process may comprise the following steps:

S301: performing image segmentation on one or more images D300 of a vehicle image and generating one or more segmented vehicle images D301 by the image processor 101;

S302: generating a texture feature map D302 for the damaged vehicle from the segmented vehicle images D301 by the texture encoder 102;

S303: extracting a damaged-vehicle frame image D303 from the segmented vehicle images D301 by the frame extractor 103;

S304: reconstructing an IVF image D304 from the damaged-vehicle frame image D303 by the IVF reconstructor 104;

S305: reconstructing an intact-vehicle image D305 from the reconstructed IVF image D304 and the texture feature map D302 by the image reconstructor 105.

S306: comparing the segmented vehicle images D301 and the corresponding reconstructed intact-vehicle image D305 pixel by pixel, generating an anomaly region detection score for each pixel; classifying a compared pixel of the reconstructed intact-vehicle image D305 as anomaly region if its anomaly region detection score is larger than a threshold, and annotating the classified anomaly region on the segmented vehicle image D301 to produce an anomaly-annotated vehicle image D306 by the anomaly locator 106.

Figure 4B:
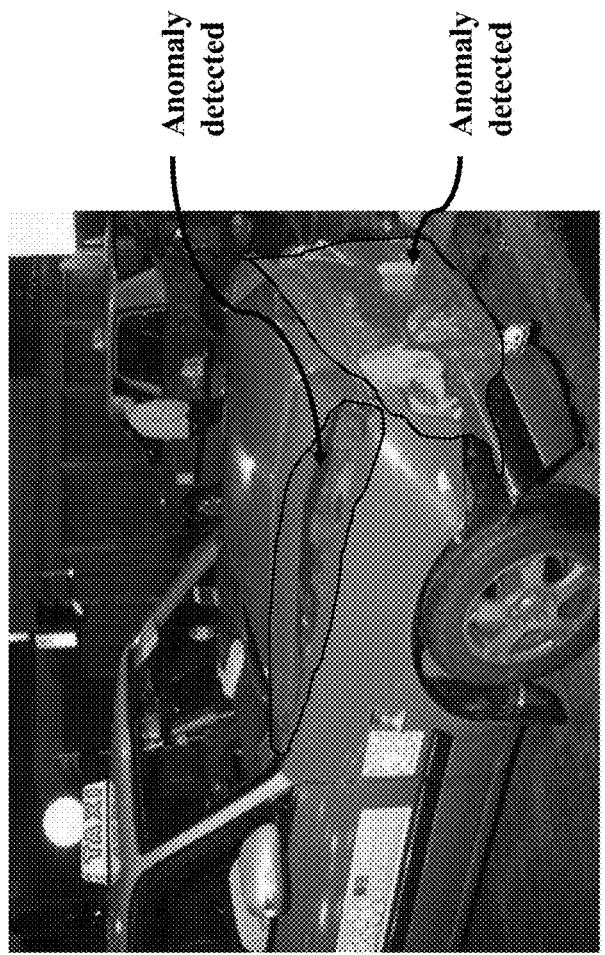
FIG. 4b illustrates anomaly detected in the input vehicle image by the trained GCAN-based generators in accordance with one embodiment of the present invention.
Figure 4A:
FIG. 4a shows an exemplary input vehicle image.

Experiments were conducted with the present invention. FIG. 4a shows an exemplary input vehicle image; and FIG. 4b illustrates the anomaly detected in the input vehicle image by the trained GCAN-based generators in accordance with afore-described embodiment of the present invention, wherein the anomaly detected was indicated and encircled by black outline.

In various embodiments, the anomaly region may be annotated as a binary mask on the corresponding reconstructed intact-vehicle image. In some embodiments, the masks are constructed with pixels being set to white.

In various embodiments, the threshold may have a predefined default value and be adjustable to have user-specified value based on various implementation scenarios.

Implementations in accordance to the various embodiments of the present invention are made for the anomaly detection in certain types of vehicles. For example, in one implementation for anomaly detection in sedans, the training dataset in the training of the GCAN-based generators contains images of undamaged normal sedans of different makes and models. For another example, in one implementation for anomaly detection in water vessels, the training dataset in the training of the GCAN-based generators contains images of undamaged normal boats of different classes and makes. Similarly, by including training dataset of images of vehicles of specific types, implementations for anomaly detections in many different types of vehicle are possible.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for image-based anomaly detection for vehicle damage assessment, comprising:
   an image processor configured for segmenting one or more input vehicle images;
   a texture encoder configured for generating texture feature maps from the segmented vehicle images;
   a frame extractor configured for extracting one or more vehicle frame images from the segmented vehicle images;
   an intact-vehicle frame (IVF) reconstructor configured for reconstructing one or more IVF images from the extracted vehicle frame images;
   an image reconstructor configured for reconstructing one or more intact-vehicle images from the reconstructed IVF images and the texture feature maps; and
   an anomaly locator configured for comparing the segmented vehicle images and their corresponding reconstructed intact-vehicle images to detect one or more anomaly regions;
   wherein the texture encoder, the frame extractor, the IVF reconstructor, the image reconstructor, and the anomaly locator are generative contextualized adversarial network (GCAN) generators trained under a GCAN model with a training dataset comprising a plurality of images of undamaged vehicles, IVF images, and augmented vehicle frame images of the vehicles.

2. The apparatus of claim 1, wherein the IVF reconstructor comprises a frame encoder configured for mapping the extracted vehicle frame images to generate IVF feature maps and a frame decoder configured for remapping IVF feature maps back to reconstructed IVF images.

3. The apparatus of claim 2,
   wherein the frame encoder comprises a stack of one or more convolutional layers configured to extract multi-scale context information represented in an IVF feature map;
   wherein the frame encoder comprises a stack of one or more deconvolutional layers to reconstruct an intact vehicle frame from the IVF feature map; and
   wherein the convolutional layers of the frame encoder and the deconvolution layers of the frame decoder are connected via one or more skip connections so as to preserve fine details and reconstruction locations of edges in the intact vehicle frame at pixel level.

4. The apparatus of claim 2, further comprising:
   a frame encoder discriminator configured for generating a score of likelihood between two IVF feature maps; and
   an image discriminator configured for generating a score of likelihood between an input vehicle image and a corresponding reconstructed vehicle image.

5. A method for image-based anomaly detection for vehicle damage assessment, comprising:
   performing image segmentation on an image of a vehicle image to generate a segmented vehicle image;
   generating a texture feature map for a damaged vehicle from the segmented vehicle image;
   extracting a damaged-vehicle frame image from the segmented vehicle image;
   reconstructing an IVF image from the damaged-vehicle frame image;
   reconstructing an intact-vehicle image from the reconstructed IVF image;
   comparing the segmented vehicle image and the reconstructed intact-vehicle image pixel by pixel;
   generating an anomaly region detection score for each pixel and classifying each of compared pixels of the reconstructed intact-vehicle image as anomaly region if its anomaly region detection score is larger than a threshold; and
   annotating the classified anomaly region on the reconstructed intact-vehicle image to produce an anomaly-annotated vehicle image;
   wherein the method is performed by generative contextualized adversarial network (GCAN) generators trained under a GCAN model with a training dataset comprising a plurality of images of undamaged vehicles, IVF images, and augmented vehicle frame images of the vehicles.

6. A method for training an apparatus for image-based anomaly detection for vehicle damage assessment, comprising:
   extracting an IVF image from an input vehicle image by a frame extractor, wherein the input vehicle image is a real or augmented image of a normal vehicle;
   extracting a texture feature map from the input vehicle image by a texture encoder;
   generating a damage-augmented vehicle frame image by performing a damage augmentation to the IVF image by an image processor;
   generating a first IVF feature map from the damage-augmented vehicle frame image by a frame encoder;
   reconstructing an IVF image from the first IVF feature map by a frame decoder;
   reconstructing an intact-vehicle image from the reconstructed IVF image and the texture feature map by an image reconstructor;
   extracting a second reconstructed IVF image from the reconstructed intact-vehicle image by the frame extractor;
   generating a second IVF feature map from the second reconstructed IVF image by the frame encoder;
   generating a score of likelihood between the first IVF feature map and the second IVF feature map by a frame encoder discriminator; and
   using the score of likelihood between the first IVF feature map and the second IVF feature map to optimize the parameterization of the frame encoder and the frame extractor.

7. The method of claim 6, wherein the damage augmentation comprises modifying one or more randomly selected regions in the IVF image by one or more of random translation, random rotation, random scaling, random line addition, noise addition, partial occlusion, and region substitution by replacing one or more of the selected regions with one or more dissimilar regions of another IVF image.

8. The method of claim 6, further comprising:
reconstructing a vehicle image from the vehicle frame image and the texture feature map by the image reconstructor;
generating a score of likelihood between the reconstructed vehicle image and the input vehicle image by an image discriminator; and
using the score of likelihood between the reconstructed vehicle image, and the input vehicle image to optimize the parameterization of the image reconstructor and the texture encoder.

9. The method of claim 6, further comprising:
reconstructing a damaged-vehicle image from the damage-augmented vehicle frame image and the texture feature map by the image reconstructor;
detecting anomaly regions by comparing the reconstructed damaged-vehicle image and the reconstructed intact-vehicle image to generate an anomaly region detection score by an anomaly locator; and
using the anomaly region detection score to optimize the parameterization of the anomaly locator.

* * * * *